Figure 1:
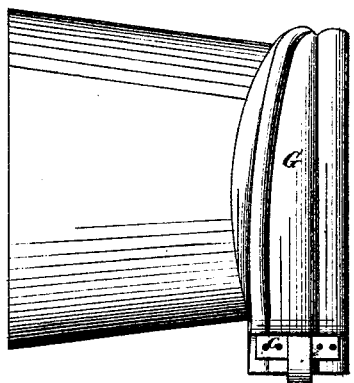
Figure 2:
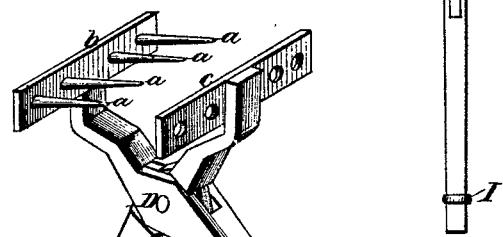
Figure 3:

J. R. McGOVERN.
APPARATUS FOR THE MANUFACTURE OF HORSE-COLLARS.
No. 183,771. Patented Oct. 31, 1876.

Witnesses.

Inventor.
John R. McGovern

UNITED STATES PATENT OFFICE.

JOHN R. McGOVERN, OF FRANKLIN, KENTUCKY, ASSIGNOR OF ONE-HALF HIS RIGHT TO THOMAS R. EUBANK, OF SAME PLACE.

IMPROVEMENT IN APPARATUS FOR THE MANUFACTURE OF HORSE-COLLARS.

Specification forming part of Letters Patent No. 183,771, dated October 31, 1876; application filed July 24, 1876.

*To all whom it may concern:*

Be it known that I, JOHN R. McGOVERN, of Franklin, in the county of Simpson and State of Kentucky, have invented a new and useful tool or clamp for closing horse-collars preparatory to blocking, which clamp or tool is fully set forth in the following specifications, reference being had to the accompanying drawing.

The object of my invention is to provide a device that shall save time and diminish expense in the manufacture of horse-collars.

The old method of closing horse-collars preparatory to blocking, by the use of twine, by my invention is dispensed with. The advantage secured in the making of horse-collars by the use of this clamp is that the strain, while blocking, is brought to bear evenly upon four rounded pins of steel, $a$, as shown in annexed drawing. These pins are made fast to a cross bar or jaw, marked $b$, passing through the collar and in through four holes in the opposite bar or jaw $c$. The cross bars or jaws $b$ and $c$ act as a vise to close the collar and in preventing too much strain upon the four steel pins, and also save time and labor in preparing the collar for blocking. It also does away with the use of twine in blocking the collar; also the necessity of cutting collars open and removing waste twine and straw is obviated preparatory to affixing the buckles, as this clamp will draw the leather sufficiently far over the top of collar to place the buckles thereon.

My invention provides a more rapid mode of closing hore-collars for the block, and, after blocking, the collar is left in perfect condition for affixing the buckles.

The bars or jaws work on a joint, D, with handles E and F, which have sufficient lever-power to bring the cross-bars $b$ and $c$ together, thus forcing the four steel pins $a$ through the collar G, and the handles are held partly together with a ring, I. The steel pins $a$ are screwed into one of the cross bars or jaws, thus making it unnecessary to buy a new clamp from the breakage of a pin, as the broken one may be removed and a new one substituted.

I claim—

The improved horse-collar clamp, composed of the hinged or pivoted cross bars or jaws $b$ $c$, one of which is provided with inwardly-projecting pins $a$, adapted to enter holes in the opposite bar or jaw, all operated by suitable lever-handles, substantially as shown, for the purpose described.

JOHN R. McGOVERN.

Attest:
J. H. LILE,
T. R. EUBANK.